Jan. 9, 1962     J. G. NABOROWSKI     3,016,477
IGNITION SYSTEM
Filed Jan. 29, 1960     2 Sheets-Sheet 1
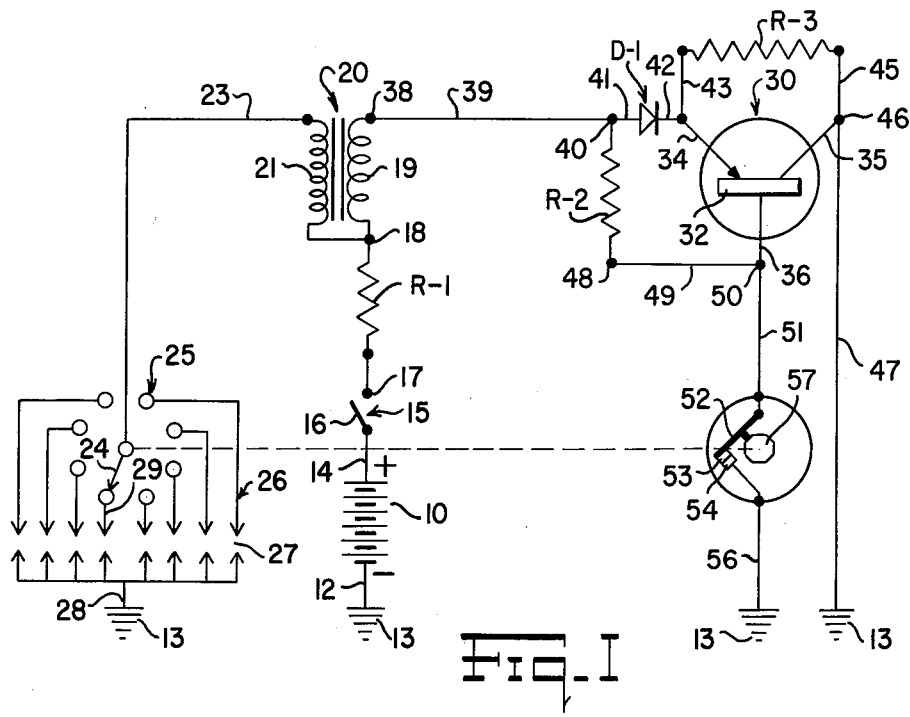
Fig. I
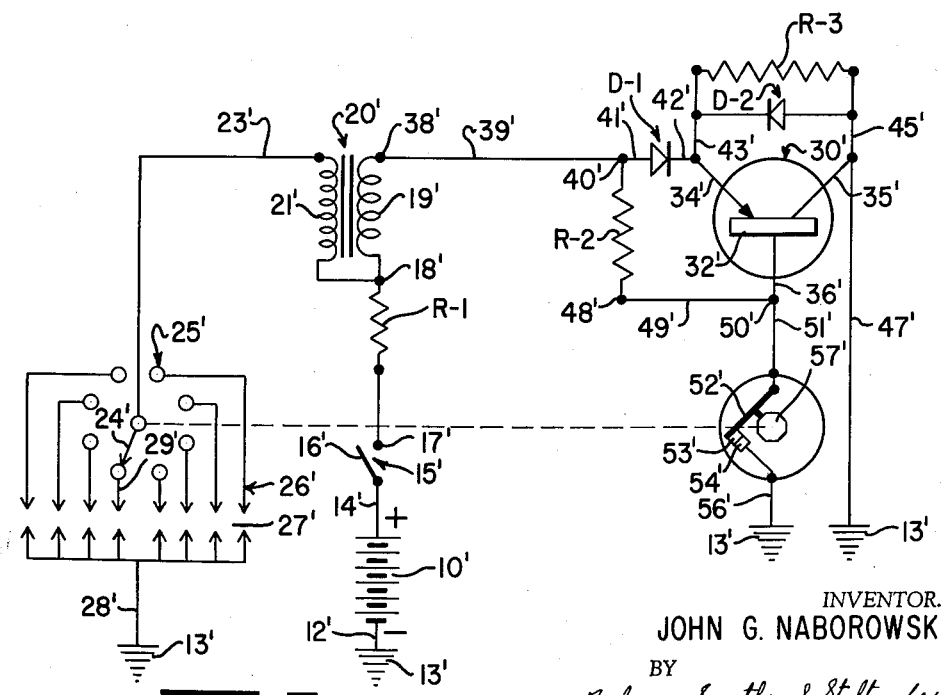
Fig. II
INVENTOR.
JOHN G. NABOROWSKI
BY
Falvey, Souther & Stoltenberg
ATTORNEYS

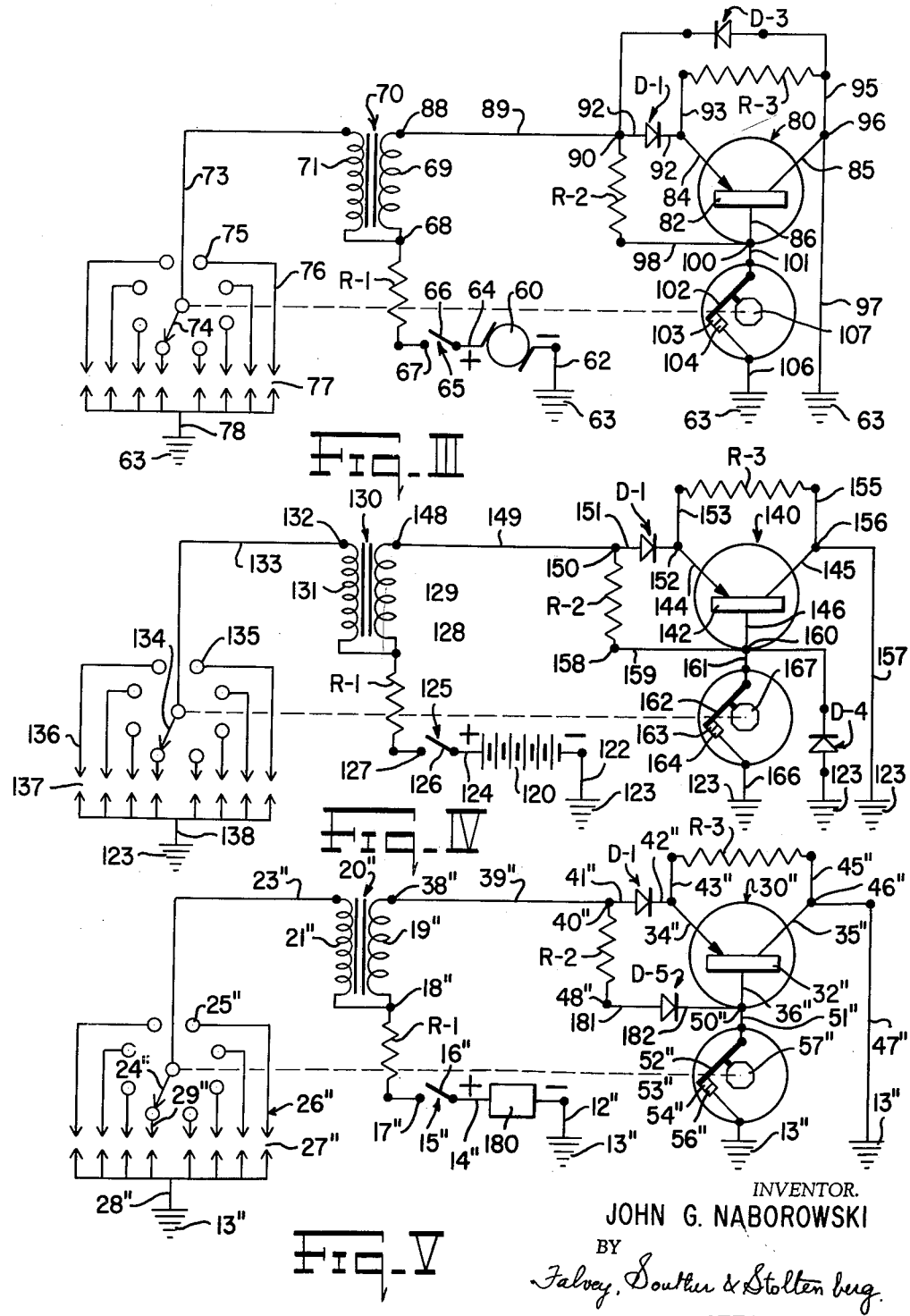

United States Patent Office 3,016,477
Patented Jan. 9, 1962

3,016,477
IGNITION SYSTEM
John G. Naborowski, Toledo, Ohio, assignor to The Electric Auto-Lite Company, Toledo, Ohio, a corporation of Ohio
Filed Jan. 29, 1960, Ser. No. 5,422
12 Claims. (Cl. 315—206)

This invention relates to electrical apparatus, and more particularly to devices and circuit arrangements adapted for use in ignition systems for internal combustion engines and the like.

The invention comprehends very stable ignition systems for multi-cylinder internal combustion engines of the high compression ratio and of the high speed type wherein the electrical discharge for igniting the combustible charge is controlled by a transistor provided with means operable to reduce its power dissipation to thereby assure the stable performance of the system.

The invention is concerned with an electrical system of extremely stable characteristics wherein a transistor which is utilized to control the input current of the electrical system is provided with bias means whereby its internal heating is reduced to thereby control the power dissipation of the transistor.

The invention comprises the control of electrical discharges for igniting combustible charges by the use of a transistor in association with unilateral conducting devices poled in the desired direction, providing thereby a control of very stable characteristics insensitive to high ambient temperature which approaches the maximum storage temperature of the transistor.

The invention contemplates novel circuitry for an ignition system for multi-cylinder engines utilizing a transistor for establishing and interrupting the energization of the system wherein the transistor network includes means so arranged that the system can be operated at high ambient temperature by reducing the power dissipation of the components of the system.

According to the foregoing summary of the invention, indicating the general nature and substance, its main objective is to provide a very stable electrical system controlled by a transistor provided with means wherein its power dissipation is materially reduced whereby the system provides long-lasting, effective performance at high ambient temperature.

Heretofore electrical systems utilizing transistors, to perform the "On" and "Off" switching function of the system, have been found unsatisfactory for use at high ambient temperature and for prolonged service due to thermal run away and lack of stability. The attainment of the stability and the prolongation of the useful life of the system, as well as of its use at high ambient temperature, presents many problems which include the control of many complex and variable factors. This is particularly true in connection with ignition systems, so that many attempts to solve these problems have been unsuccessful and ignition systems utilizing transistors have not found commercial acceptance as the proposed systems have not overcome the drawbacks before enumerated.

One of the principal objects of the invention is to avoid the foregoing drawbacks and produce a very stable, high-energy input ignition system of extremely reliable characteristics and long-lasting effective life for use with multi-cylinder engines of the high compression ratio and high speed type which is not restricted to low ambient temperature.

Another object of the invention is to provide an electrical system in which a current of high magnitude supplied by an electric source for energizing a current-consuming device is established and interrupted by a transistor provided with devices and novel circuit connections for reducing its normal power dissipation to thereby reduce its internal heating during the time that the transistor is performing the current-interrupting function.

Another object of the invention is to provide an ignition system using a transistor to cause the energization and current interruption of the primary winding of the transformer or ignition coil having means to produce a sharp cut off of its current-interrupting function, whereby the rapidity of the collapse of the magnetic field through the winding is increased.

Another object of the invention is to provide an ignition system for modern multi-cylinder, high-speed internal combustion engines wherein a transistor controls the periodic energization of the system whereby the drawbacks and performance failures of ignition systems using conventional make and break contacts to control such current are avoided, so that optimum performance is secured.

Another object of the invention is to provide an electrical system having a biasing network for a transistor used as the current "On" and "Off" means of the system whereby not only thermal run-away of the transistor is substantially eliminated but the amplified leakage current is reduced.

Another object of the invention is to provide a transistorized ignition system for internal combustion engines having a transistor circuitry to keep the transistor at its transconductance voltage preventing the same from going to saturation and thereby increasing its speed of response to means operating in timed relation with the engine.

Another object of the invention is the provision of a transistorized ignition system for combustible fuel wherein leakage currents are decreased, thereby reducing the flow of ineffective current through the ignition coil whereby its power dissipation is decreased and drain of the current source in the "Off" condition is substantially reduced.

Another object of the invention is to provide a transistorized ignition system for automobile internal combustion engines wherein the conventional automobile storage battery functions in a three-fold manner: first, as a source of energizing current for the system; second, as the bias control source for the transistor; and, third, as biasing source for the means utilized to decrease the normal internal heating of the transistor.

A further object of the invention is the provision of an ignition system wherein the primary current to the ignition coil is supplied by way of the emitter-collector path of a transistor in association with unilateral conducting devices to produce a sharp cut-off and effectively reduce the power dissipation of the components of the system.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

FIG. I is a schematic circuit diagram of an ignition system embodying the principles of the invention; and FIGS. II to V inclusive are schematic circuit diagrams illustrating modified forms of an ignition system incorporating the principles of the invention.

In the drawings, the invention is illustrated in its application to an ignition system used for igniting the combustible charge of multi-cylinder engines subjected to variable conditions of load and speed. However, it is contemplated that the principles of the invention may find physical expression in other electrical systems and devices and, therefore, it should be understood that the invention is not limited to the embodiments shown but that its principles may be practiced in different ways and used wherever the same may find useful application.

Referring particularly to FIG. I of the drawings, an ignition system is illustrated in which a single source of electrical energy is preferably utilized to supply all the requirements of the system. In the embodiment shown, a low voltage unidirectional electric source, such as an electric storage battery 10 supplies the energization of the step-up transformer or ignition coil which provides the electrical discharge required for firing spark plugs as well as the source of bias voltage for controlling the "on" or "off" current switching function of the transistor and the source for the biasing voltage used in the bias network for the transistor which operates to materially reduce the normal power dissipation of the transistor. This reduction is secured according to the principles of the invention by providing a bais voltage on the transistor, so that during its "Off" condition the amplified leakage current is reduced to zero. In following the principles of the invention, it is contemplated that other sources of supply of unidirectional electric current may be utilized to perform the functions accomplished by the storage battery.

In FIG. I, the storage battery 10, acting as the single source of direct current supply for the system, has its negative terminal connected by lead 12 to ground, or a common return connection 13, while its positive terminal is connected by lead 14 to the movable number 16 of the main control switch 15 adapted to be manually actuated to open and close the main circuit of the system. The stationary member 17 of the switch 15 is connected to a terminal of a ballast or current-limiting resistor R-1 which has the other terminal suitably connected to the terminal post 18 of the primary winding 19 of the step-up transformer or ignition coil 20 which operates to periodically induce, in the secondary winding 21, the high voltage or electromotive force required to produce the electrical discharge to ignite the combustible mixture by firing the gap of the spark plugs. For this purpose, the secondary winding 21 has one of its terminals connected to the terminal post 18 and its other terminal connected by high tension lead 23 to the distrirbutor rotor 24 adapted to contact, in timed relation, each of the stationary distributor contacts 25 and thereby, by suitable leads 26, apply the electromotive force of the secondary winding to each of the firing gaps 27 of the spark plugs which have one of its electrodes grounded as at 28. For purpose of illustration, and by way of example only, the transistorized ignition system embodying the present invention is shown in conjunction with an 8-cylinder internal combustion engine and the distributor rotor 24 is connected to the stationary contact 25 of spark plug 29. Thus, the secondary circuit of the ignition coil 21 is connected to the firing gap 27 of the spark plug 29 and the combustible mixture in the cylinder associated with this plug will ignite upon the firing of gap 27.

According to the principles of the present invention, a semi-conductor device, preferably a transistor 30, is used for establishing and interrupting the flow of energizing current to the load constituted by the primary winding 19 of the ignition coil from the unidirectional electric source of substantially constant low voltage current 10.

In the embodiment of the invention shown in FIG. I, the semi-conductor device 30, may, by way of example, take the form of a PNP junction transistor comprising the semi-conductor body 32 having, in cooperative relationship therewith, the emitter electrode 34, collector electrode 35, usually designated as contact or current-rectifying electrodes, and the base 36, commonly designated as the ohmic contact electrode of the transistor.

To accomplish the control of the flow of energizing current to the ignition coil by the transistor, the terminal post 38 of the primary winding 19 is connected by lead 39 to the junction formed by the interconnection of a terminal 40 of a suitable current-limiting resistor R-2 and the terminal lead 41 of a unilateral conducting device such as the diode D-1, suitably poled for forward current conduction, which has its other terminal 42 connected to a second junction connection formed by the interconnection of the terminal of the emitter electrode 34 and the terminal lead 43 of the shunting resistance R-3, which has its other terminal lead 45 connected to the terminal 46 of the collector electrode 35, in turn, connected by lead 47 to ground 13.

It can be seen that in the embodiment shown in FIG. I, the switch 15 ballast resistance R-1, primary winding 19, and diode D-1 are in series connection with the emitter and collector electrodes of the transistor and the shunting resistance R-3, constituting thereby the current input circuit of the ignition coil connected across the storage battery 10. This circuit is operable by the "On" and "Off" function of the transistor to cause the interruption of the flow of energizing current to the primary winding of the ignition transformer and thereby induce, in the secondary, the potential required for the electrical discharge across the firing gap of the spark plug. The circuit controlling the "On" and "Off" function of the transistor to periodically apply the proper biasing voltages to the transistor electrodes includes the resistor R-2 having its terminal 40 connected by the diode D-1 to the emitter and its other terminal 48 connected by lead 49 to the base electrode 36. The junction 50 of the base electrode and the lead 49 is connected by conductor 51 to the breaker arm 52 of the conventional distributor carrying the movable contact 53 cooperating with the stationary contact 54 which is connected to the ground 13 by lead 56. The breaker arm 52 and its movable contact 53 is actuated in timed relation with the engine by means of a cam 57 mechanically interconnected with the distributor rotor 24 by suitable means shown in dotted lines for providing synchronization between the interruption of the control circuit of the transsistor and the high-tension distributor rotor 24.

The circuit to apply the biasing voltage for the "On" and "Off" function of the transistor, inclusive of the conventional distributor contacts constituting the main control means, is connected across the source of unidirectional potential or terminals of the storage battery 10 through the primary winding and ballast resistance R-1, whereby the application of the potential biasing voltage to the electrodes of the transistor for its "On" and "Off" function is dependent on the opening and closing of the distributor contacts 53—54. It can be seen, therefore, that when the contacts 53 and 54 are in the open position, the transistor is turned off.

It should be noted that in the "Off" condition of the transistor, the diode D-1 is conducting in the forward direction and a small current can pass through the resistance R-3 shunting the emitter and collector electrodes of the transistor, and thus, in normal operation, the resistance R-3 will conduct regardless of any other condition of the circuit whenever the switch 15 is in its closed position. In carrying the invention to practice, the value of the resistance R-3 is preferably chosen, so that the diode D-1 will have approximately 0.5 volt drop in the forward direction caused by the current flowing through resistance R-3, bearing in mind that the ballast resistance, as well as the resistance of the primary winding is relatively low, whereby most of the supply voltage will appear across diode D-1 and R-3 combination, so that the current through the diode D-1 will be determined by the value of the resistance R-3. In carrying the invention into practice, it has been chosen that the current passing through the resistance R-3 would be preferably in order of 25 milliamps, which, in turn, causes, across the diode D-1, a forward voltage drop of approximately 0.5 volt. The diode D-1 is so connected that its forward voltage drop appears as a reverse bias on the base to the emitter electrodes of the transistor, bearing in mind that the base electrode 36 is directly connected to the positive terminal lead of the diode D-1. This reverse voltage on the diode D-1 causes both the collector-base and emitter-base junctions of the transistor to be reversed biased. This, in turn, causes leakage current of extremely low value in these two junctions, whereby the amplified leakage current is eliminated, so that the power dissipation of the transistor is materially reduced during its "Off" condition when the contacts 53 and 54 are in open position.

In addition, it should be noted that the value of the resistor R-2 interconnecting the base electrode 36 by the diode D-1 to the emitter electrode 34 should be low enough, so that the leakage current flowing therethrough will not overcome the reverse bias produced by the diode D-1. However, the resistor R-2 should be of sufficient high value to limit the current flowing through the ignition timing contacts 53—54, so that this current should not be too great to affect their operation.

When the contacts 53—54 are closed, the transistor is turned "On" or in its conductive condition because its base 36 is at negative potential with respect to the emitter 34, allowing the flow of current to energize the winding 19 connected in series therewith. During the time that the contacts are closed, the voltage at the junction of the diode D-1 and the primary winding 19 decreases in value, thereby the current through the resistance R-3 decreases. However, such reduction is not detrimental because the voltage drop across the diode is a non-linear function with respect to the current passing therethrough, so that with a 10 amp. flow, the forward voltage drop is approximately in the order of one volt.

FIG. II illustrates another form of the electrical system of the invention, wherein a source of supply of substantially constant direct electric current such as a storage battery 10' is used for the energization of the load such as the primary winding, as well as for the application of the voltage bias for the "On" and "Off" function of a transistor to thereby control the flow and interruption of the energizing electric current in the input circuit of the ignition coil. The battery 10' has its negative terminal connected by lead 12' to ground 13' and its positive terminal is connected by lead 14' to the manually operable member 16' of the control switch 15'. The stationary member 17' of the switch 15' is connected to the terminal of a ballast or current-limiting resistor R-1 which has its other terminal connected to terminal post 18' of the primary winding 19' of the ignition coil 20' which periodically induces, in the secondary winding 21', the high potential required to produce an electrical discharge to the firing gap of the spark plugs associated with the engine cylinder. The high tension circuit of the secondary winding includes the high tension lead 23' connecting the secondary winding to the rotor 24' of a conventional distributor operable in timed relation with the engine cylinders for engagement with the contacts 25' connected by leads 26' for firing gaps 27' of the spark plugs which has one of its electrodes grounded as at 28'.

In the modified form of the invention, a transistor 30', preferably of the PNP class having a semi-conductor body 32' in cooperative relationship with the emitter electrode 34', collector electrode 35', and base electrode 36', is used for establishing and interrupting the flow of the energizing current from the battery 10' to the load of the system which finds a counter-part in the primary winding 19' of the ignition coil. In order to control the flow of energizing current to winding 19' by the transistor 30', the terminal post 38' of the primary winding 19' is connected by lead 39' to the junction formed by terminal 40' of the current-limiting resistor R-2 and the terminal lead 41' of the diode D-1 poled for forward current conduction which has its other terminal 42' connected to a second junction connection formed by the terminal of the emitter 34' and the terminal lead 43' of the shunting resistance R-3 connected by terminal lead 45' to terminal 46' of the collector electrode 35' which, in turn, is connected by lead 47' to ground 13'.

In the embodiment of the invention shown in FIG. II, the switch 15', ballast resistance R-1, primary winding 19' and diode R-1 are serially connected with the emitter and collector electrodes of the transistor 30' and the shunting resistance R-3 across the terminals of the storage battery 10' constituting the load or main circuit of the ignition system. In this form of the invention, the secondary diode D-2 is connected across the emitter and collector electrodes of the transistor and is poled for conducting current in the opposite direction to the direction of diode D-1. Thus the secondary diode D-2 is used in this form of the invention as means to prevent reverse bias on the transistor and avoid the possibility of emitter to collector reverse current. In addition, it is contemplated that a conventional diode may be used for the diode D-2. However, it has been found that if the diode of the Zener type is used, it provides additional voltage protection for the transistor.

The control of the flow and the interruption of the energizing current to the winding 19' is secured by applying the proper polarity bias to the electrodes of the transistor 30' for its "On" or "Off" function. In order to facilitate the "On-Off" condition of transistor 30', a branch circuit, adapted to be periodically connected across the battery 10', is provided. This branch circuit includes the resistor R-2 having its terminal 40' connected at the junction of the winding 19' and the terminal 41 of the diode D-1 and having its other terminal 48' connected to the base 36' by lead 49' forming a junction connection 50', thus resistor R-2 provides an external connection between the emitter 34' and base 36' through the diode D-1. The junction 50' is connected by conductor 51' to the main switching contacts of the branch circuit which are shown as the conventional distributor contact 53' and stationary contact 54' connected to ground 13' by lead 56'. The movable contact 53' is moved to open or closed position through the engagement of the breaker arm 52' with a cam 57' driven by the engine and which, in turn, is mechanically interconnected with the distributor rotor 24' by suitable means shown in dotted lines to provide synchronization therebetween for firing the gaps 27' of the spark plugs in proper timed relation with the engine.

In the form of the invention shown in FIG. II, it can be seen that when the contacts 53' and 54' are in open position, the transistor is turned "Off," or in its non-conductive condition because the base 36' of the transistor 30' is at the same potential as the emitter 34'. In addition, the collector junction of the transistor is at a negative potential with respect to the base and emitter electrodes due to the ground connection provided by the lead 47'. During the "Off" condition of the transistor, the diode D-1 in this form of the invention, is conducting in the forward direction and a small current flows through the shunting resistance R-3 whenever the switch 15' is in its closed position. It should be noted that the ballast resistance R-1 and the winding 19' are of relatively low value and, therefore, the potential of the battery 10' will appear across the diode D-1 and R-3 combination, so that the current through the diode D-1 will be determined by the value of the resistance R-3. In view of the circuit connection of the diode D-1, and its polarity, the forward voltage drop will appear as a reverse bias on the base to the emitter electrode of the transistor, causing both the collector-base and emitter-base junctions of the transistor to be reversed biased, whereby the amplified leakage is eliminated, so that the power dissipation of the transistor is materially reduced during its "Off" condition when the same is in its non-conductive condition resulting by the opening of ignition timing contacts 53' and 54'.

Another form of the electrical system of the invention is illustrated in FIG. III, wherein a source of supply of substantially constant direct electric current, such as the generator 60, is used for the energization of the load such as the primary winding of an ignition system, as well as for the application of the voltage for the "On" and "Off" function of a transistor to thereby control the flow and interruption of the energizing electric current in the input circuit of the ignition coil. The generator 60 has its negative terminal connected by lead 62 to ground 63 and its positive terminal is connected by lead 64 to the manually operable member 66 of the control switch 65. The stationary member 67 of the switch 65 is connected to the terminal of a ballast or current-limiting resistor R-1 which has its other terminal connected to terminal post 68 of the primary winding 69 of the ignition coil 70 which periodically induces, in the secondary winding 71, the high potential required to produce an electrical discharge to the firing gap of the spark plugs associated with the engine cylinder. The high tension circuit of the secondary winding 71 includes the lead 73 which connects the high tension terminal of the secondary winding to the rotor 74 of a conventional distributor operable in timed relation with the engine cylinders for engagement with the contacts 75 connected by leads 76 for firing gaps 77 of the spark plugs which has one of its electrodes grounded as at 78.

In the form of the invention illustrated in FIG. III, a transistor 80, preferably of the PNP class having a semiconductor body 82 in cooperative relationship with the emitter 84, collector 85, and base electrode 86 is used for establishing and interrupting the flow of the energizing current from the generator 60 to the load of the system which finds a counter-part in the primary winding 69 of the ignition coil. In order to control the flow of energizing current to winding 69 by the transistor 80, the terminal post 88 of the primary winding 69 is connected by lead 89 to the junction formed by terminal 90 of the current-limiting resistor R-2 and the terminal lead 92 of the diode D-1 poled for forward current conduction which has its other terminal 92 connected to a second junction connection formed by the terminal of the emitter 84 and the terminal lead 93 of the shunting resistance R-3 connected by terminal lead 95 to terminal 96 of the collector electrode 85 which, in turn, is connected by lead 97 to ground 63.

As shown in FIG. III, the switch 65, ballast resistance R-1, primary winding 69, and diode D-1 are serially connected with the emitter and collector electrodes of the transistor 80 and the shunting resistance R-3 across the terminals of the generator 60 constituting the load or main circuit of the ignition system.

In the form of the invention shown in FIG. III, an auxiliary diode D-3 is connected to junction 90 and terminal 96 of the collector electrode 85 whereby diode D-3 provides a parallel circuit connection across both the resistance R-3 and diode D-1 and is poled for current conduction in the opposite direction to that of diode D-1 so as to prevent high forward voltage from appearing across the transistor and also provides damping of the oscillations of the ignition coil. In carrying the invention to practice, the diode D-3 is preferably of the Zener type. However, standard types of diodes may be used effectively to perform the functions before outlined.

The flow and interruption of the energizing current to winding 69 is secured by applying the proper polarity bias to the electrodes of the transistor 80 for its "On" or "Off" condition. To facilitate the "On" and "Off" condition of transistor 80, a branch circuit, adapted to be periodically connected across the terminals of the generator 60, is provided. This branch circuit includes resistor R-2 having one of its terminals connected to junction 90 formed by the winding 69 and the terminal 92 of diode D-1 having its other terminal connected by lead 98 to the base 86 forming a junction 100. Thus the resistor R-2 performs a permanent external connection between emitter and base electrodes of the transistor through diode D-1. This permanent connection is, in turn, connected by lead 101 to the periodically operable switching contacts provided for alternately connecting the branch circuit to the negative terminal of the generator. The switching contacts are shown as a conventional make and break timing contact 103 and stationary contact 104 connected by lead 106 to ground 103 providing a return connection with the negative generator terminal 62. The contact 103 is actuated to open and closed position through the engagement of a pivoted breaker arm 102 with an 8-lobe cam 107 driven by the engine, which cam, in turn, is connected to the high-tension distributor 74 by suitable means shown in the dotted lines to provide synchronization therebetween for firing the spark gaps 77 of the spark plugs in proper timed relation with the engine cylinders.

It can be seen that when the timing contacts 103 and 104 are in open position, the transistor is in its "Off" or non-conductive condition because the base 86 and the emitter 84, due to the external connection provided in the branch circuit, are at the same positive potential, while the collector junction of the transistor is at a negative potential with respect thereto because of its connection to ground provided by lead 97. In this form of the invention, during the "Off" condition of the transistor, the diode is conducting in the forward direction and a small current flows through diode D-1 and the resistance R-3 whenever the switch 65 is in its closed position. It should be noted that the ballast resistance R-1 and the winding 69 are of relatively low value and, therefore, the potential of the generator 60 will appear across the diode D-1 and R-3 combination, so that the current through the diode D-1 will be determined by the resistance R-3. In carrying the invention to practice, the value of the resistance R-3 is preferably chosen, so that the diode D-1 will have approximately 0.5 volt drop in the forward direction caused by the current flowing through resistance R-3. The diode D-1 is so connected that its forward voltage drop appears as a reverse bias on the base to the emitter electrodes of the transistor. This reverse voltage bias causes the collector-base and emitter-base junctions of the transistor to be reversed biased which causes, in turn, a leakage current of extremely low value in these two junctions, whereby the amplified leakage current is eliminated, so that power dissipation of the transistor is materially reduced during its "Off" condition when the make and break contacts 103 and 104 are in open position.

It should be noted that the value of the resistor R-2 in this form of the invention externally interconnecting the base electrode 86 to the emitter 84 by diode D-1 should be low enough, so that the leakage current flowing therethrough will not overcome the reverse bias produced by diode D-1. Moreover, the resistor R-2 should be of high enough value to limit the current flowing through the timing contacts 103—104 so as not to impair their normal operation.

When the timing contacts 103—104 are in closed position, the transistor 80 is in its conductive condition or is turned "On" because the base 86 is at a negative potential with respect to emitter 84 and thus allows the flow of current from the battery to energize the winding 69 connected in series therewith.

FIG. IV shows another embodiment of the invention, wherein a single source of supply of direct electric current is provided by the battery 120 used for the energization of the primary winding of step-up transformer, as well as the source for the voltage bias used for the "On" and "Off" function of a transistor which operates to control the flow and interruption of the energizing electric current in the input or main circuit of the ignition system shown. The negative terminal of the battery 120 is connected by lead 122 to ground 123 while its positive terminal is connected by lead 124 to the manually operable member 126 of the main switch 125. The switch contact 127 is connected to a terminal of a ballast or current-limiting resistor R-1 which has its other terminal connected to terminal post 128 of the primary winding 129 of the step-up transformer 130 used to periodically induce, in the secondary winding 131, the potential required for firing the spark gaps of the spark plugs associated with the engine cylinders. The circuit for applying the high voltage of the step-up transformer to the spark plugs is provided through lead 133 connecting the high tension terminal 132 of winding 131 to the rotor 134 of a conventional distributor operable in timed relation with the engine cylinders for engagement with each of the stationary contacts 135, in turn connected by leads 136 to the spark gaps 137 of the spark plugs, each grounded as at 138.

A transistor 140, preferably of the PNP class, having a semi-conductor body 142 in cooperative relationship with the emitter 144, collector 145, and base 146, is used, in the form of the invention shown in FIG. IV, for establishing and interrupting the flow of the energizing current from the battery 120 to the winding 129 of the step-up transformer 130. To obtain the flow and interruption of the energizing current from the battery 120 to winding 129 by the transistor 140, a series circuit is provided by connecting the terminal post 148 of the winding 129 by lead 149 to the junction formed by terminal 150 of the current-limiting resistor R-2 and the terminal lead 151 of the diode D-1, poled for forward current conduction, which has its other terminal 152 connected to a second junction connection. This junction is formed by the terminal of the emitter 144 and the terminal lead 153 of the shunting resistance R-3 connected by its terminal lead 155 to terminal 156 of the collector electrode 145, in turn connected by lead 157 to ground 123 or common return to the battery 120. It can be seen that in the form of the invention shown in FIG. IV, the switch 125, ballast resistance R-1, primary winding 129 and diode D-1 are serially connected with the emitter 144 and collector 145 of the transistor 140 and the shunting resistance R-3 across the terminals of the storage battery 120, thereby constituting the main circuit of the ignition system.

In the form of the invention shown in FIG. IV, the flow and interruption of the energizing current to winding 129 is secured by applying the proper polarity bias to the electrodes of the transistor 140 for its "On" or "Off" condition. In order to facilitate the "On" and "Off" condition of transistor 140, a branch circuit is provided which is adapted to be periodically connected across the terminals of the battery 120. This branch circuit includes resistor R-2 having one of its terminals connected to junction 150 formed by the connector of the winding 169 and the terminal 151 of diode D-1 having its other terminal 158 connected by lead 159 to the base 146 forming a junction 160. Thus the resistor R-2 performs a permanent external connection between emitter and base electrodes of the transistor through diode D-1. This permanent connection is, in turn, connected by lead 161 to the periodically operable switching contacts provided for alternately connecting the branch circuit to the negative terminal of the battery 120. The switching contacts are shown as a conventional make and break timing contact 163 and stationary contact 164 connected by lead 166 to ground 123 providing a return connection to the negative battery terminal. The contact 163 is actuated to open and closed position through the engagement of a pivoted breaker arm 162 with an 8-lobe cam 167 driven by the engine, which cam, in turn is mechanically connected to the high-tension distributor rotor 134 by suitable means shown in the dotted lines to provide synchronization therebetween for firing the spark gaps 137 of the spark plugs in proper timed relation with the engine cylinders.

In the form of the invention shown in FIG. IV, an auxiliary diode D-4 is connected between the base electrode 146 of the transistor and the ground or common return 123 by suitable terminals, one of which is directly connected to the junction 160 and the other to the ground proper. The diode D-4 is a clamping diode and is poled for conduction from the ground to the base and preferably has a lower threshold voltage than the collector to base, thereby preventing the collector to base from being forward biased. Moreover, the diode clamps collector to base junction at a value lower than the normally forward threshold voltage of the collector to base junction.

When the contacts 163 and 164 are in open position, the transistor 140 is in its "Off" or non-conductive condition because the base 146 and the emitter 144, due to their external connection forming a part of the branch circuit, are at the same positive potential, while the collector junction is at a negative potential with respect thereto because of its connection to ground 123 by lead 157. During the "Off" condition of the transistor, the diode D-1 is conducting in the forward direction and a small current flows through diode D-1 and R-3 whenever the switch 125 is in its closed position. In view of the fact that the ballast resistance R-1 and the winding 129 are of relatively low value, the potential of the battery 120 will appear across the diode D-1 and R-3 combination, and, therefore, the current through D-1 is determined by the resistance R-3. In carrying the invention to practice, the value of the resistance R-3 is preferably chosen, so that the diode D-1 will have approximately 0.5 volt drop in the forward direction caused by the current flowing through resistance R-3. The diode D-1 is so connected that its forward voltage drop appears as a reverse bias on the base to the emitter electrodes of the transistor. This reverse voltage bias causes the collector-base and emitter-base junctions of the transistor to be reversed biased which causes, in turn, a leakage current of extremely low value in these two junctions, whereby the amplified leakage current is eliminated, so that power dissipation of the transistor is materially reduced during its "Off" condition when the make and break contacts 163 and 164 are in open position.

It should be noted that the value of the resistor R-2 in the form of the invention shown in FIG. IV externally interconnecting the base electrode 146 to the emitter 144 by diode D-1 should be low enough, so that the leakage current flowing therethrough will not overcome the reverse bias produced by diode D-1. Moreover, the resistor R-2 should be of high enough value to limit the current flowing through the timing contacts 163—164 so as not to impair their normal operation.

When the timing contacts 163 and 164 are in closed position, the transistor 140 is in its conductive condition or is turned "On" because the base 146 is at a negative potential with respect to emitter 144 and thus allows the flow of current from the battery to energize the winding 129 connected in series therewith.

FIG. V shows a modification of the embodiment of the invention illustrated in FIG. I utilizing a regulator source of supply 180 for providing a substantially constant unidirectional electric current for the energization of the primary winding of an ignition coil as well as the source for the voltage bias used for the "On" and "Off" function of a transistor which operates to alternately establish and interrupt the flow of the energizing current in the input or main circuit of the ignition system shown. In view of the fact that the main physical characteristics of the components of the ignition system and circuit connections are substantially the same to those illustrated in FIG. I, the same are identified by double priming the same reference numerals used in connection with the embodiment shown in FIG. I. However, in the form of the invention illustrated in FIG. V, a secondary diode D-5 takes the place of the lead 49 connecting the terminal 48″ of the resistor R-2 to the base electrode 36″ by connecting the diode D-5 to terminal 48″ by lead 181 and the terminal of the diode D-5 by lead 182 to junction 50″.

In the form of the invention shown in FIG. V, the diode

D-5 is poled in the same direction as diode D-1 and is incorporated in the branch circuit to prevent base-collector reverse current.

In order to provide at a relatively low cost an efficient ignition system capable of firing fouled spark plugs and permit the use of low cost transistors preventing impairment of their effective life, this invention contemplates the use of an ignition or a step-up transformer wherein the voltage induced in the primary winding is not greater than 80 volts which is several times of less value than the voltage induced in the conventional ignition coil primary. In practicing the invention, it has been found very effective in securing such low voltage to use a step-up transformer having a substantially closed core of high permeability magnetizable material preferably of grain-oriented, high-percentage silicon steel, with its primary and secondary windings directly mounted thereon in concentric relation having a turn ratio at least greater than 250 to 1, and using a primary winding characterized by having a very low inductance and comparatively few turns, preferably not greater than 80 turns.

It should be noted that diode D-1 and resistance R-3 combination used in the main circuit of the embodiments of the invention disclosed provides a very simple and effective means of reverse biasing the emitter and base junction of the transistor when the timing contacts are open. This insures very effective transistor cut "Off" even at high temperatures and this action is enhanced by keeping the value of resistor R-2 as low as possible but not too low or it will permit too much current to flow through the timing contacts forming the main component of the control circuit disclosed. In addition, it is well to point out that the present invention provides a transistorized electric system including a transistor circuitry to keep the transistor at its transconductance voltage preventing the same from going to saturation, so that the speed of response to the application of the biasing voltage for its "On" and "Off" function is materially increased.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. An ignition system for multi-cylinder internal combustion engines subjected to variable operating conditions of load and speed comprising a unidirectional source of electric current, a transistor, a unilateral conducting device, a step-up ignition transformer having its primary and secondary windings mounted on a magnetizable core, main circuit connections for the flow of the energizing electrical current from said source to the primary winding of said ignition transformer through said transistor, a control circuit including said unilateral conducting device for causing the operation of said transistor as "On" or "Off" current switching means for said main circuit connections, and means operable in timed relation with the engine for connecting and disconnecting said control circuit across said source to cause by the operation of said transistor the application and interruption of the flow of the energizing current to the primary winding of said ignition transformer.

2. An ignition system for multicylinder internal combustion engines comprising a unidirectional source of electric current, a transistor, a unilateral conducting device, an ignition coil having close coupled primary and secondary windings, a main circuit for the flow of the energizing electrical current from said source to the primary winding of said ignition coil including said transistor and said unilateral conducting device, a control circuit including said unilateral conducting device for causing the operation of said transistor as "On" or "Off" current switching means for said main circuit, and means operable in timed relation with the engine for connecting and disconnecting said control circuit across said source to cause by the operation of said transistor the application and interruption of the flow of the energizing current to the primary winding of said ignition coil.

3. An ignition system for multicylinder internal combustion engines comprising a unidirectional source of electric current, a transistor having emitter collector and base electrodes, a unilateral conducting device, a resistor, an ignition coil having primary and secondary windings, a main circuit for the flow of the energizing electrical current from said source to the primary winding of said ignition coil including in series connection said unilateral conducting device the emitter and collector of said transistor, a bias network for reducing the power dissipation of the transistor including said resistor and said unilateral conducting device in a circuit connecting the base and emitter of said transistor, and means for connecting and disconnecting said bias network to said source to cause by the operation of said transistor the application and interruption of the flow of the energizing current to the primary winding of said ignition coil.

4. A circuit arrangement comprising a unidirectional source of current, a current-consuming device, a resistance unit, a transistor having a semiconductor body provided with emitter collector and base electrodes, a unilateral conducting device, a main circuit connected across said source comprising in a series connection said current-consuming device with said unilateral conducting device and the emitter and collector electrodes of said transistor whereby the flow of current therein is controlled by said transistor, a secondary circuit in which said resistance unit is connected between the emitter and collector electrodes of said transistor, a control circuit for said transistor including said unilateral conducting device, and switch means connected to said control circuit and source of current operable for connecting and disconnecting said control circuit across said source of unidirectional current.

5. An electrical system comprising a unidirectional source of current, a current-consuming device, a transistor having a semiconductor body provided with emitter collector and base electrodes, a unilateral conducting device, a resistance unit, a main circuit connected across said source comprising in a series connection the emitter and collector electrodes of said transistor with said unilateral conducting device and said current-consuming device wherein the flow of current therein is controlled by said transistor, a secondary circuit in which said resistance unit is connected across the emitter and collector electrodes of said transistor, a second circuit in which are interconnected the emitter and base electrodes of said transistor through said unilateral conducting device, and switch means connected to said second circuit operable for connecting and disconnecting said second circuit to said source of unidirectional current.

6. An ignition system for multicylinder internal combustion engines comprising an unidirectional source of electric current, a transistor having a semiconductor body provided with emitter collector and base electrodes, a resistance unit, a unilateral conducting device, a resistor, an ignition coil having primary and secondary windings, a main circuit for the flow of the energizing electrical current from said source to the primary winding of said ignition coil including in series connection said unilateral conducting device the emitter and collector of said transistor, a secondary circuit in which said resistance unit is connected between the emitter and collector electrodes of said transistor, a bias network for reducing the power dissipation of the transistor including in series connection said resistor and said unilateral conducting device in a circuit connecting the base and emitter of said transistor, and means operable in timed relation with the engine for connecting and disconnecting said bias network to said source to cause by the operation of said transistor the application and interruption of the flow of the energizing current to the primary winding of said ignition coil.

7. An ignition system as set forth in claim 6 wherein a second unilateral conducting device is connected across the base and collector electrode of said transistor.

8. An ignition system for multicylinder engines comprising a source of direct electrical current, a transistor having a semi-conductor body provided with emitter collector and base electrodes, a resistance unit, a unilateral conducting device, a resistor, a second unilateral conducting device, a transformer having primary and secondary windings, a main circuit for the flow of energizing electric current from said source to said primary winding including in series connection said first unilateral conducting device the emitter and collector electrodes of said transistor, a secondary circuit in which said resistance unit and said second unilateral conducting device are in parallel connection across the emitter and collector electrodes of said transistor, a control network for reducing the power dissipation of the transistor including in series connection said resistor and said first unilateral conducting device across the emitter and base electrodes of said transistor, and means operable in timed relation with the engine for connecting and disconnecting said control network to said source to cause by the operation of said transistor the flow and interruption of the energizing current to the primary winding for intermittently obtaining a high voltage across said secondary winding.

9. An ignition system for multicylinder internal combustion engines having high voltage distribution means the combination comprising a supply of direct electric current having its negative terminal grounded, a transistor having two contact rectifying and an ohmic contact electrodes cooperating with a semiconductor body, a resistance, a unilateral conducting device, a high voltage transformer having its primary and secondary windings mounted in concentric relation on a core, main circuit connections for the flow of the energizing current from the non-grounded terminal of said supply to said primary winding through the contact rectifying electrodes and said unilateral conducting device, a branch circuit provided by connecting said resistance across the contact rectifying electrodes of the transistor, a control circuit for causing the operation of said transistor as "On" and "Off" current means including a permanent interconnection between the ohmic contact electrode and one of the contact rectifying electrodes of the transistor through said unilateral conducting device, and means operable in timed relation with the engine for connecting and disconnecting said control circuit to the grounded terminal of said current supply for intermittently obtaining a high voltage across said secondary winding and applying said voltage to said high voltage distribution means.

10. An ignition system as set forth in claim 9 wherein a second unilateral conducting device is connected between the ohmic contact electrode and the other contact rectifying electrode of said transistor.

11. An electrical system comprising a source of direct electric current, a current-consuming device, a transistor having a semiconductor body provided with emitter, collector and base electrodes, a resistance, an unilateral conducting device, a main circuit connected across said source comprising in series connection the emitter and collector electrodes with said unilateral conducting device and said current-consuming device wherein the flow of current is controlled by the "On" and "Off" function of the transistor, a branch circuit provided by connecting said resistance across the emitter and collector electrodes of said transistor, a control circuit in which are permanently interconnected the emitter and base electrodes of said transistor through said unilateral conducting device and switch means connected to said control circuit operable for connecting and disconnecting said control circuit to said source of direct current.

12. A circuit arrangement comprising a source of direct electric current, a current-consuming device, a diode, a resistance unit, a transistor having a semi-conductor body provided with emitter collector and base electrodes, a secondary diode, a main circuit connected across said source comprising in series connection with said current-consuming device said first diode and the emitter and collector electrodes of the transistor whereby the current therein is controlled by the "On" and "Off" function of the transistor, a branch circuit provided by connecting in parallel connection said resistance unit and secondary diode across the emitter and collector electrodes of the transistor, a control circuit for said transistor provided by permanently connecting the base and emitter electrodes through said first diode, and switch means connected between said control circuit and said source of current for connecting and disconnecting said control circuit across said source.

References Cited in the file of this patent

UNITED STATES PATENTS

| 2,852,588 | Hartman | Sept. 16, 1958 |
| 2,852,589 | Johnson | Sept. 16, 1958 |
| 2,878,298 | Giacoletto | Mar. 17, 1959 |

FOREIGN PATENTS

| 218,293 | Australia | Nov. 3, 1958 |